United States Patent [19]
Weber

[11] Patent Number: 4,684,279
[45] Date of Patent: Aug. 4, 1987

[54] BALL JOINT

[75] Inventor: Frederick C. Weber, Englewood, Ohio

[73] Assignee: General Motors Corporation, Detroit, Mich.

[21] Appl. No.: 891,625

[22] Filed: Aug. 1, 1986

Related U.S. Application Data

[63] Continuation-in-part of Ser. No. 790,434, Oct. 23, 1985, abandoned.

[51] Int. Cl.⁴ .............................................. F16C 11/00
[52] U.S. Cl. .................................... 403/136; 403/140; 403/143
[58] Field of Search ................ 403/135, 136, 140, 143

[56] References Cited

U.S. PATENT DOCUMENTS

| | | |
|---|---|---|
| 3,226,142 | 12/1965 | Herbenar . |
| 3,260,543 | 7/1966 | Henry-Biabaud . |
| 3,309,117 | 3/1967 | Gottschald ........................ 403/135 |
| 3,355,199 | 11/1967 | Melton et al. ................. 403/140 X |
| 3,355,787 | 12/1967 | Sullivan, Jr. . |
| 3,410,587 | 11/1968 | Scheublein, Jr. et al. . |
| 3,411,815 | 11/1968 | Sullivan, Jr. . |
| 3,554,586 | 1/1971 | Cutler ................................. 403/140 |
| 3,667,789 | 6/1972 | McNeely et al. . |
| 3,749,415 | 7/1973 | Sampatacos . |
| 3,802,789 | 4/1974 | Patton et al. . |
| 3,833,309 | 9/1974 | Hobbs . |
| 3,846,032 | 11/1974 | Harada . |
| 4,101,228 | 7/1978 | Scheerer ......................... 403/143 X |
| 4,241,463 | 12/1980 | Khovaylo ....................... 403/143 X |
| 4,358,211 | 11/1982 | Goodrich, Jr. et al. . |
| 4,372,621 | 2/1983 | Farrant . |
| 4,478,531 | 10/1984 | Levinson et al. . |

*Primary Examiner*—Andrew V. Kundrat
*Attorney, Agent, or Firm*—Patrick M. Griffin

[57] ABSTRACT

A ball joint of the type having a ball stud and preformed plastic socket includes means for sealing the stud head receiving socket opening and assuring the maintenance of the seal in spite of accumulated tolerance variations. A cap with an inwardly converging peripheral closure surface fits within and conforms closely to a matching closure surface in the socket opening. Deformable protuberances on the outer side of the cap are engaged and deformed by a surface of the suspension control arm to which the socket is mounted, or by a surface of a cover which fixes the socket to the control arm. The protuberances extend far enough from the cap outer side to assure that engagement and deformation in spite of accumulated tolerance variations in the components of the ball joint. The deformation forces the cap into the socket opening as the ball joint is completed to engage the closure surfaces more tightly and assure maintenance of the seal of the socket opening.

3 Claims, 6 Drawing Figures

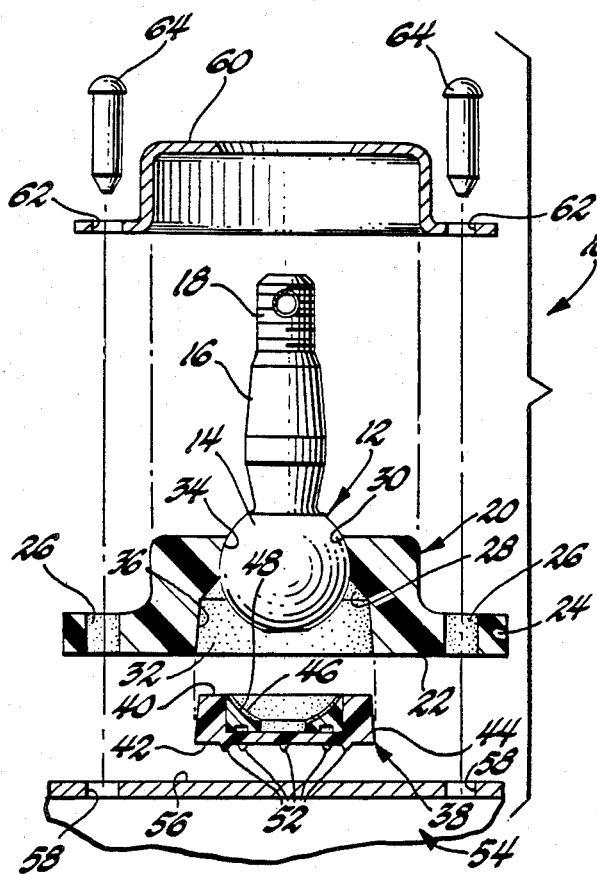

BALL JOINT

This is a continuation-in-part of Ser. No. 790,434, filed Oct. 23, 1985 and now abandoned.

FIELD OF THE INVENTION

This invention concerns ball joints in general, and specifically a ball joint that has a novel means for sealing a stud receiving opening in a socket and for assuring the maintenance of that seal in spite of accumulated tolerance variations in the ball joint.

BACKGROUND OF THE INVENTION

Ball joints are found in automotive vehicles in two common applications, in steering linkages, between a tie rod and a steering arm, and in vehicle suspensions, between a suspension control arm and a steering knuckle. In either application, a ball joint generally includes a stud having a spherical head with a shank extending from the head, and a socket having a cavity within which the stud head is supported and turns. For purposes of illustration, the spherical stud head may be divided into two hemispheres, the hemisphere from which the shank extends being called the shank hemisphere, and the hemisphere opposite the shank being called the free hemisphere. It is known to assemble a ball joint by injection molding the socket directly around the spherical stud head. In such a case, a preformed socket cavity is not necessary because the socket material will automatically form its own cavity in the shape of the outer surface of the stud head during molding. With injection molding, the automatically formed cavity will inherently wrap around and provide a bearing seat to support as much of both stud head hemispheres as is desired. However, it is often preferable that the socket be preformed with a cavity into which the stud may be later inserted, so that the exact shape of the socket and socket cavity may be more closely controlled. In such a case, the stud has to be inserted through an opening into the cavity of the preformed socket in order to assemble the ball joint. The two possible methods of inserting the stud are head first or shank first. The United States patents disclose examples of each.

Examples of head first stud insertion may be seen in the U.S. Pat. Nos. 3,309,117 to Gottschald and 3,355,787 to Sullivan, also assigned to the assignee of the present invention. It will be understood that with head first insertion, only one opening into the socket cavity is strictly necessary, an opening large enough to admit the spherical head of the stud. However, Gottschald clearly illustrates a disadvantage with this method of assembly. The preformed socket may be easily molded with a cavity shaped to conform to and support the entire free hemisphere of the stud head. However, if the socket cavity is to be substantially rigid and still admit the stud head freely, it cannot be molded with a cavity designed to wrap around and support any substantial portion of the shank hemisphere of the stud head. A ball joint assembled with the head first method of insertion may, therefore, not be suitable if the stud is to be subjected to anything but a compression load, that is, anything but a load that forces the stud head into the socket cavity.

There are two known ways, with head first insertion, of providing a preformed socket with a cavity that also wraps and supports a substantial portion of the shank hemisphere of the stud head. One way is to mold the socket of a material that will yield significantly as the stud head is inserted, flexing past the largest diameter of the stud head, and then wrapping back around part of the shank hemisphere. Another way is to form part of the socket cavity around the shank hemisphere after the stud head has been inserted, as a subsequent assembly step. The U.S. Pat. No. 3,226,142 to Herbenar shows an example of a socket of yieldable material with an opening to the cavity that is smaller than the diameter of the stud head, so that the socket cavity will flex and wrap around part of the shank hemisphere as the socket is forced over the stud head. Of course, there would be limitations on the rigidity, strength and thickness of such a yieldable socket. In Sullivan, a subsequent cold forming step is carried out in order to form part of the socket material around the shank hemisphere of the stud head. Although this socket design provides good support to the stud head, it would be desirable to eliminate that assembly step, if possible.

Examples of the shank first method of inserting a stud into a preformed socket cavity may be seen in the U.S. Pat. Nos. 3,846,032 to Harada et al and 3,833,309 to Hobbs. With shank first insertion, there are two opposed openings into the socket cavity, a smaller one large enough to admit the stud shank, but not the stud head, and a larger one large enough to admit the stud head. The socket cavity generally includes a first bearing seat adjacent to the smaller opening and engageable with the shank hemisphere of the stud head. The ball joint is assembled by inserting the stud shank first through the larger opening until the shank hemisphere of the stud head engages the first bearing seat with the stud shank extending through the smaller cavity opening. One of the benefits of a ball joint assembled in this fashion is that support for the shank hemisphere of the stud head may be easily provided by the first bearing seat. The first bearing seat may be preformed and shaped as desired, and no subsequent shaping steps will be necessary. The engagement of the shank hemisphere with the first bearing seat also effectively closes the smaller socket cavity opening, which provides what is termed a travel window for the outwardly extending shank. However, there is the converse problem here of providing support to the free hemisphere of the stud head. Another potential drawback is the larger socket cavity opening, which it is necessary to cover, and which it is desirable to securely seal to retain lubricant around the stud head and keep contaminants out of the socket cavity. In Harada et al, the larger opening is covered with a lower housing member 4 that is joined to an upper housing member 3 around the outside of the socket 1. Also, a separate second bearing seat is provided for the free hemisphere of the stud head. However, the larger opening in the socket 1, although covered, is not directly sealed or plugged. In Hobbs, the larger opening is directly sealed by a plug 12, which is secured by sonic welding into the opening. However, there is nothing to back up the securement of the plug 12, which depends entirely on the strength of the sonic weld.

SUMMARY OF THE INVENTION

The invention provides two embodiments of a ball joint with a stud having a shank and a head and a preformed socket, a first embodiment assembled by the shank first method, and a second assembled by the head first method. Each embodiment provides for sealing that socket cavity opening which is left open after insertion of the stud head into the cavity, as well as assuring the maintenance of that seal in spite of accumulated tolerance variations in the ball joint. Each embodiment of the ball joint of the invention includes a stud having a head and a shank, these being a spherical head and a generally cylindrical shank of a diameter smaller than the diameter of the stud head. Each also includes a preformed socket molded of a suitable plastic material which has a cavity adapted to receive the head of the stud.

In the first embodiment, the cavity has opposed first and second openings thereto, the first opening being large enough to admit the shank of the stud, but not the head, while the second opening is larger, large enough to admit the stud head. The cavity also includes a closure surface adjacent to and completely around the second opening that converges in a direction into the cavity. As disclosed, the closure surface is frustoconical, defines the second opening, and converges toward the first opening. The socket also includes a first bearing seat adjacent the first opening and engageable with the stud head. Therefore, the stud may be inserted shank first into the socket cavity through the second opening until the shank hemisphere of the stud head engages the first bearing seat with the shank extending through the first opening.

The second opening is sealed by a cap having opposed inner and outer sides and a peripheral closure surface extending between the sides that substantially conforms to the cavity closure surface. As disclosed in the first embodiment, the cap closure surface is also frustoconical and matches the frustoconical closure surface of the socket cavity. In addition, the inner side of the cap includes a second bearing seat that is engageable with the free hemisphere of the stud head. Therefore, when the stud has been inserted into the cavity, the cap can be inserted into the second opening inner side first until the matching frustoconical closure surfaces on the cap and socket engage and the second bearing seat engages the stud head. This engagement of the conforming closure surfaces serves both to seal the second opening and establish a preload of the stud head between the first and second bearing seats. The outer side of the cap also includes a deformable protuberance that extends a predetermined distance therefrom.

The first embodiment of the ball joint also includes a housing member having a surface portion, which, as disclosed, is advantageously provided by a suspension member that has a substantially planar surface portion. After the cap has been inserted into the second opening of the socket as described, the ball joint is completed with a suitable cover means adapted to fix the socket to the suspension member so that the outer side of the cap faces the suspension member surface portion. The cover means disclosed is of stamped metal, fits over the outside of the socket and is riveted to the suspension member. Accumulated tolerance variations in the socket, stud, cap, or the suspension member surface portion, or all of these, may result in the outer side of the cap being spaced from the suspension member surface portion by a varying amount. To accommodate this tolerance variation, the predetermined distance that the deformable protuberance extends from the outer side of the cap is sufficient to assure that the protuberance will engage, and be deformed by, the suspension member surface portion as the socket is riveted to the suspension member. That deformation forces the cap toward the first opening, which, in turn, forces the matching frustoconical cavity and cap closure surfaces into tighter engagement, since they converge toward the first opening. This tighter engagement of the closure surfaces, in turn, assures that the seal of the second opening is maintained, as well as maintaining the preload of the stud head between the first and second bearing seats.

In the second embodiment, the socket cavity has only one opening thereto, which admits the head of the stud. The cavity also includes a frustoconical closure surface adjacent to and completely around the one opening that converges in a direction into the cavity. Therefore, the stud may be inserted head first into the socket cavity through the one opening until the free hemisphere of the stud head engages the inner surface of the socket cavity with the shank extending out through the one opening.

The one opening in the second embodiment is also sealed by a cap having opposed inner and outer sides and a frustoconical peripheral closure surface extending between the sides that substantially conforms to the cavity closure surface. In addition, the cap of the second embodiment has an opening therethrough large enough to admit the stud shank, an opening defined by a bearing seat surface engageable with the shank hemisphere of the stud head. Therefore, after the stud has been inserted into the cavity, the cap can be inserted inner side first into the opening and over the stud shank until the matching frustoconical closure surfaces on the cap and socket, as well as the bearing seat surface and shank hemisphere of the stud head, engage. These engagements cooperate to seal the one opening. As with the first embodiment, the outer side of the cap also includes a deformable protuberance that extends a predetermined distance therefrom.

The second embodiment also includes a housing member provided by a suspension member and a cover means similarly adapted to fit over the socket and be riveted to the suspension member to complete the ball joint. In the second embodiment, however, the inside of the cover means is provided with a substantially planar surface portion. After the cap has been inserted into the opening of the socket as described, and the ball joint completed, the outer side of the cap faces the surface portion of the cover means and the deformable protuberances on the cap are crushed against the cover means surface portion, rather than against the surface of the suspension member itself. Therefore, just as with the first embodiment, any accumulated tolerance variations in the socket, stud, cap, suspension member or surface portion of the cover means, or all of these, which may result in the outer side of the cap being spaced from the cover means by a varying amount, are accommodated. And, as with the first embodiment, the cap will be forced more tightly into the cavity opening, and the bearing seat on the cap will be forced more tightly against the stud head, which serves to assure or back up the seal.

It is, therefore, a general object of the invention with a ball joint of the type having a stud with a head and a socket with a cavity, to provide for sealing a stud head receiving opening to the cavity by a means that assures tight sealing of the opening while accounting for accumulated tolerance variations in the various components of the ball joint which accumulate as the ball joint is assembled.

It is another object of the invention to accomplish such a sealing by providing the opening to the socket cavity with a closure surface adjacent to and completely around the opening that converges in a direction into the cavity, and providing a cap for the opening having opposed inner and outer sides with a peripheral closure surface extending between the inner and outer sides that substantially conforms to the cavity closure surface, so that the cap may be inserted inner side first into the opening after the stud has been inserted into the cavity to thereby engage the cap and cavity closure surfaces to seal the opening, and to also provide a deformable protuberance extending a predetermined distance from the cap outer side, so that, when the socket, received stud and inserted cap together are fixed by a suitable cover means to a housing member provided by a suspension member having a surface portion, with the cap outer side facing either the surface of the suspension member or facing a surface of the cover means, that predetermined distance will be sufficient to assure that the protuberance engages and is deformed by the surface that the outer side of the cap faces, regardless of any accumulated tolerance variations in the various components that may result in the cap outer side being spaced from the surface portion that it faces by a varying amount, thereby assuring that cap is forced into the opening to assure maintenance of the seal.

It is yet another object of the invention to provide the cap and the cavity opening with matching frustoconical surfaces and to provide the socket cavity and cap with bearing seats, so that the deformation of the protuberance on the cap as the socket is fixed to the suspension member by the cover means acts to force the matching frustoconical surfaces more tightly together to both assure the seal and to also maintain a preload of the stud head between the bearing seats.

DESCRIPTION OF THE PREFERRED EMBODIMENT

These and other objects and features of the invention will appear from the following written description and drawings, in which:

FIG. 1 is a partially exploded view of the first embodiment of the invention showing some of the structural elements in cross section;

FIG. 2 is a view similar to FIG. 1, but showing the structural elements assembled;

FIG. 3 is an enlarged view of a a portion of FIG. 2;

Figure 4:
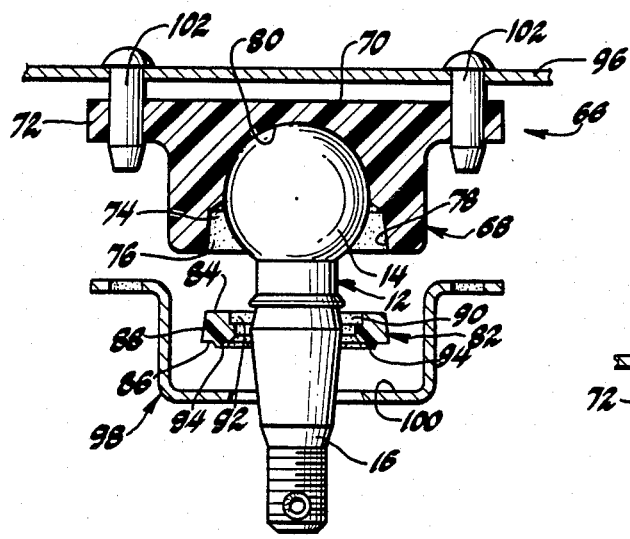
FIG. 4 is a view similar to Figures of a second embodiment.

Referring first to FIG. 1, the first embodiment of the ball joint of the invention is designated generally at 10. Ball joint 10 includes a stud designated generally at 12 that has a spherical head 14 and a generally cylindrical shank 16 of a diameter smaller than the diameter of the stud head 14. The end of stud shank 16 is conventionally threaded and apertured at 18 for attachment to a steering knuckle of a vehicle suspension, not illustrated. A socket designated generally at 20 is molded from acetal plastic, or other suitable material, and is generally cylindrical in shape with a flat lower surface 22 and a peripheral lower flange 24 with four apertures 26 therethrough. Socket 20 is also molded with a generally centrally located cavity 28 that has a pair of opposed openings thereto, a first opening 30 through the top of socket 20 and a second opening 32 through lower surface 22. First opening 30 is large enough to admit stud shank 16, but not stud head 14, as clearly appears in FIG. 1 Cavity 28 also includes a first bearing seat 34 adjacent first opening 30 and engageable with the stud head 14, which is shown already so engaged. The second opening 32 is larger, large enough to admit the stud head 14. Cavity 28 also includes a closure surface adjacent to and completely around the second opening 32, which, in the preferred embodiment, is a frustoconical surface 36 that defines the second opening 32 and that converges toward the first opening 30.

Still referring to FIG. 1, it may be easily understood, given the relative sizing of the first and second cavity openings 30 and 32, that stud 12 may be inserted shank 16 first into the socket cavity 28 through the second opening 32 until the stud head 14 engages the first bearing seat 34, with the shank 16 extending through the first opening opening 30. The first bearing seat 34 wraps a substantial portion of the upper hemisphere of the stud head 14, which may be referred to as its shank hemisphere. Therefore, the shank hemisphere of stud head 14 will engage the first bearing seat 34 as stud 12 is inserted to effectively close first opening 30 with no further shaping of socket 20. Being able to so close the first opening 30, which provides a travel window for shank 16, is an advantage of shank first assembly. As disclosed, first bearing seat 34 also wraps a small portion of the lower or free hemisphere of stud head 14, so that some pressure will be necessary to pop fit stud head 14 into cavity 28. It will be understood, however, that the extent of the wrap of first bearing seat 34 is a matter of design choice. Whatever the configuration of first bearing seat 34, another result of shank first insertion is the existence of the larger second opening 32, which the invention advantageously fills and seals, as will be next described.

Still referring to FIG. 1, a cap designated generally at 38 is molded of acetal plastic with an inset inner side 40, a generally flat outer side 42 and a peripheral frustoconical closure surface 44 extending between the inner and outer sides 40 and 42. The peripheral frustoconical closure surface 44 matches the cavity frustoconical closure surface 36 in shape and slope, and will therefore substantially and closely conform to it. The inset inner side 40 of cap 38 also includes a second bearing seat 46 of urethane which is engageable with the free hemisphere of stud head 14. As best seen in FIG. 3, second bearing seat 46 also includes lubricant grooves 48 and an annular groove 50, the depth of which may be varied to vary its resilience. The other feature of cap 38 that appears from FIG. 1 is a plurality of generally cone shaped protuberances 52 molded integrally with cap outer side 42, numbering eight in the preferred embodiment. The protuberances 52 extend from cap outer side 42 a predetermined distance, approximately 1.5 mm., for a purpose discussed below.

As may be best seen in FIG. 2, once the stud head 14 has been inserted into cavity 28, the cap 38 can be inserted inner side 40 first into the second opening 32 until the converging matching frustoconical closure surfaces 36 and 44 engage and second bearing seat 46 engages the free hemisphere of stud head 14 The engagement of the matching frustoconical closure surfaces 36 and 44 and their close conformation serves to seal the second opening 32, thus completing the closure of cavity 28 to retain lubricant and exclude contaminants. The depth of insertion of cap 38 is also controlled by the engagement of closure surfaces 36 and 44, thereby controlling the degree of compression of the second bearing seat 46 and establishing a preload of the stud head 14 between the first and second bearing seats 34 and 46. Once cap 38 has been so inserted, it may be epoxied or sonically welded in place to give a separately handled subassembly, not illustrated. Although cap outer side 42 is inset from socket lower surface 22, protuberances 52 still extend past lower surface 22.

Referring next to FIGS. 2 and 3, the first embodiment 10 of the invention is intended to be used, and finds special utility when used, between a steering knuckle, not illustrated, and a control arm of a suspension, designated generally at 54. Control arm 54, which is a lower control arm as disclosed, has a substantially planar upper surface portion 56 with four apertures 58 therethrough which match socket flange apertures 26. Ball joints typically have a separate cylindrical metal housing that would be mounted through a large aperture in the suspension control arm. In the ball joint of the invention, however, a housing member to complete ball joint 10 is conveniently provided by suspension member control arm 54. Once cap 38 is in place, a metal cover 60 which generally matches the outside shape of socket 20 is placed over socket 20, and four apertures 62 in cover 60 are aligned with apertures 26 and 58. In this position, the lower surface 22 of socket 20 sits on the surface portion 56 and the outer side 42 of cap 38 faces and is slightly spaced from the same surface portion 56. Four rivets 64 are fastened through the aligned apertures 62, 26 and 58 and headed over, thereby fixing socket 20 to control arm 54 and completing ball joint 10

It will be understood that tolerance variations in the manufacture of any or all of socket 20, stud 12, cap 38 or the control arm surface portion 56 may accumulate, which may result in the outer side 42 of cap 38 being spaced from the surface portion 56 by a varying amount. Further, a force tending to drive stud 12 toward cap 38 would, without some counteracting means, tend to force cap 38 out of second opening 32 and threaten to break the weld or epoxy and open the seal. To accommodate the possible accumulated tolerance variations, the predetermined distance that the deformable protuberances 52 extend from the cap outer side 42 is sufficient to assure that the protuberances 52 will engage, and be deformed by, the surface portion 56 as the socket 20 is riveted in place. FIG. 3 clearly shows that deformation has occurred, and room is provided by the spacing of cap outer side 42 for that deformation to occur. The deformation of protuberances 52 forces the cap 38 toward the first opening 30. So forcing cap 38, in turn, forces the matching frustoconical cavity and cap closure surfaces 36 and 44 into tighter engagement, since they converge toward the first opening 30. This tighter engagement assures that the seal of the second opening 32 is maintained. In addition, the tighter engagement of closure surfaces 36 and 44 serves to maintain the preload of the stud head 14 between the first and second bearing seats 34 and 46. The first embodiment 10, since it has the second bearing seat 32 on the free hemisphere of the stud head 14 and the relatively large first bearing seat surface 34, is particularly well suited to resisting axial loads on the stud 12 that reverse direction. Also, the socket 20 has sufficient lateral thickness to well resist lateral loading. Therefore, it will be seen that the advantages of shank first insertion are achieved, while the potential drawbacks are avoided.

Referring next to FIG. 4, the second embodiment, designated generally at 66, uses an identical stud 12, but is assembled by the head first method. The remaining components, although they are similar to and incorporate the same broad invention as the first embodiment 10, do have differences and are numbered differently in the interest of clarity. The materials used are the same, however, and other similarities allow for a briefer description. The socket 68 has the same general shape as the socket 20, with a flat upper surface 70 and an apertured peripheral flange 72. The socket 68, however, has a cavity 74 with only one opening 76 thereinto, which is large enough to admit the stud head 14. While the socket 66 is in that sense easier to seal, it still must be sealed. For that purpose, the cavity 74 also includes a frustoconical closure surface 78 adjacent to and completely around the one opening 76 that converges in a direction into the cavity 74. Therefore, the stud 12 may be inserted head first into the socket cavity 74 through the one opening until the free hemisphere of the stud head 14 engages the inner surface 80 of the cavity 74 with the shank 16 extending out through the one opening 76. The inner surface 80 of the cavity is shaped so as to conform to and engage the free hemisphere of the stud head 14 to provide an upper bearing seat therefor.

Still referring to FIG. 4, the cavity opening 76 is also sealed by a cap, designated generally at 82, which, like the first embodiment 10, has opposed inner and outer sides 84 and 86 and a frustoconical peripheral closure surface 88 that substantially conforms to the cavity closure surface 78. Unlike the first embodiment 10, the cap 82 has an opening 90 therethrough large enough to admit the stud shank 16, an opening defined by a bearing seat surface 92. The bearing seat surface 92 is designed to engage the shank hemisphere of the stud head 14. As disclosed, the bearing seat surface 92 has a circular notch therearound to provide some room for its deformation by, and therefore better conformation to, the stud head 14, although some other surface configuration could be used. Again, the cap outer side 86 has crushable, deformable protuberances 94 thereon, of a number, material and extent like those 52 of the first embodiment 10. The second embodiment 66 also includes a housing member provided by a suspension member, which in this case is an upper control arm 96. A stamped metal cover 98 is sized and apertured similar to cover 60. However, in the second embodiment 66, the planar inner surface 100 of cover 98 has additional significance, as will appear below.

Figure 5:
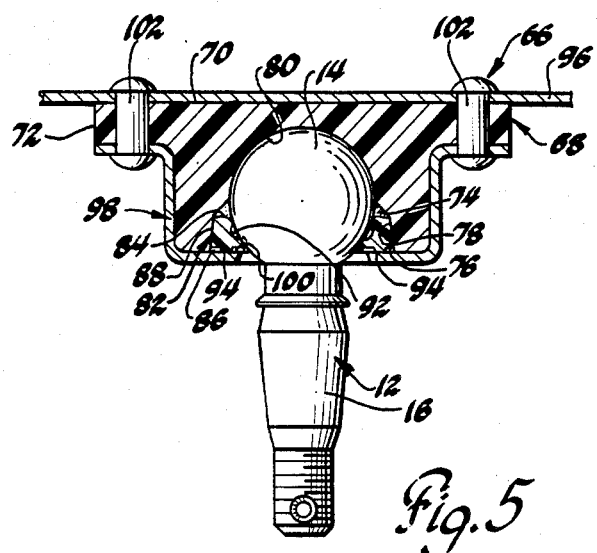
FIG. 5 is a view similar to FIG. 2 of the second embodiment.
Figure 6:
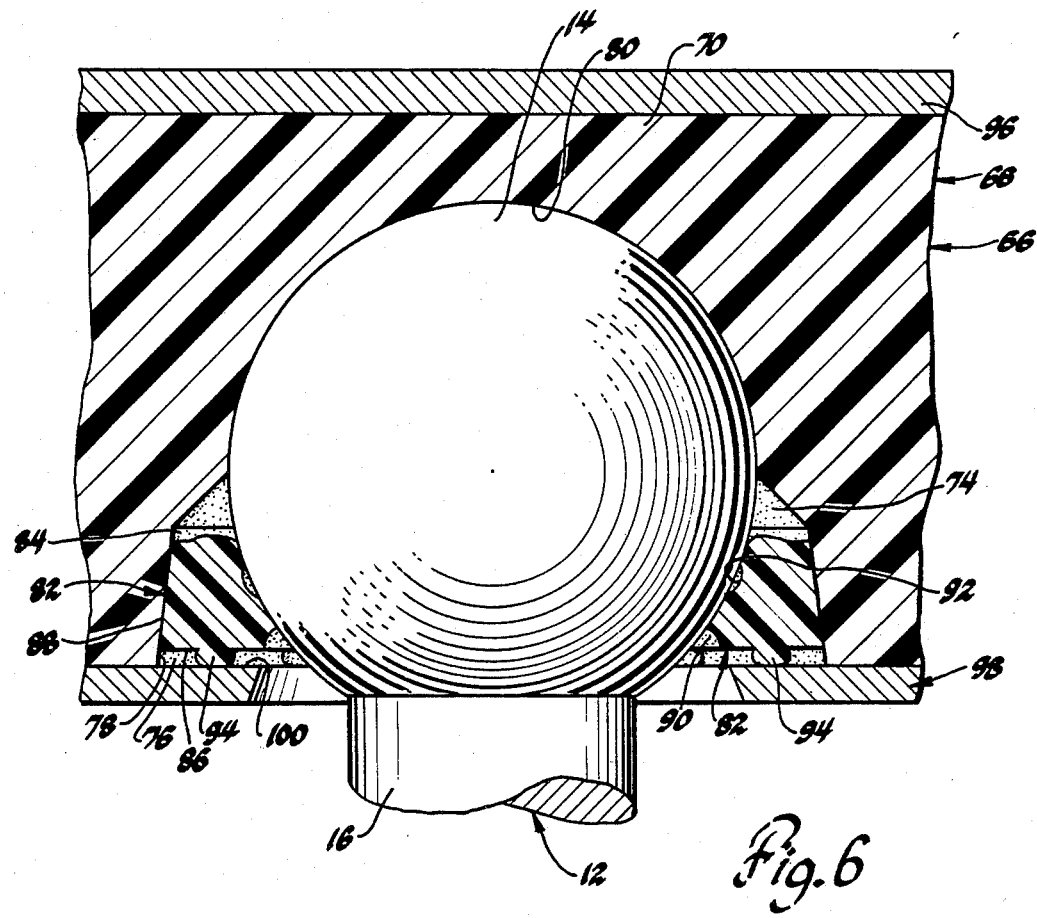
FIG. 6 is a view similar to FIG. 3 of the second embodiment.

Referring now to FIGS. 5 and 6, the ball joint of the second embodiment 66 is assembled as follows. After the stud head 14 has been inserted into the cavity 74, the cap 82 is inserted inner side 84 first into the opening 76 with the stud shank 16 passing through the cap opening 90 until the matching frustoconical cap and cavity closure surfaces 88 and 78 engage, sealing the opening 76. As with the first embodiment 10, the depth of insertion of the cap 82, as determined by the mating of the frustoconical surfaces 88 and 78, also determines how strongly the stud head 14 is preloaded between the inner cavity surface 80 and the bearing seat surface 92. The engagement of and slight deformation of the cap bearing seat surface 92 by the stud head 14 is best seen in FIG. 6. The engagement of the cap bearing seat surface 92, by sealing the cap opening 90, also cooperates to help seal the cavity opening 76. After insertion of the cap 82, the cover 98 is placed over the outside of the socket 68 and attached by rivets 102 to control arm 96, with the upper socket surface 70 against the control arm 96. Here, the cap outer surface 86 is spaced not from the surface of the control arm 96, but from the inner surface 100 of the cover 98. So it is that surface 100 which engages and crushes the protuberances 94 to take up any accumulated tolerances in the components. As with the first embodiment 10, that crushing acts to force the cap 82 into the cavity 74 to back up and assure the maintenance of the seal by tightening the engagement of the engaged surfaces, as well as maintaining any desired preload of the stud head 14. The second embodiment 66, with its single opening 76 and uninterrupted socket 68 above the stud head 14, is particularly well suited to resist loads tending to compress or force the stud head 14 into the cavity 74.

It should be understood that variations of the embodiments 10 and 66 disclosed may be made within the spirit of the invention. For example, the sockets might be made of a yieldable material that would provide enough wrap to the stud head 14 to eliminate the need for one of the bearing seats. However, there would always be an opening to the socket cavity to seal, even if it were smaller in diameter, and the deformation of the protuberances would still act maintain that seal. The spacing of the cap outer side from the surface portion of either the suspension member or the cover inner surface provides a convenient crush space for the protuberances, but relieved areas in the cap outer side around the base of the protuberances could provide that, as well. The control arms to which each embodiment is mounted could be either lower or upper, depending on the loading expected, or some other suspension member could serve, as well. In addition, other shapes for the closure surfaces may be used, such as stepped surfaces. As long as there is substantial conformance and inward convergence of the closure surfaces, the advantages of the invention are achieved. Therefore, it will be understood that the invention is not intended to be limited to the exact embodiments disclosed.

The embodiments of the invention in which an exclusive property or privilege is claimed are defined as follows:

1. A ball joint, comprising;
a stud having a head,
a socket having a cavity with an opening sized so as to admit said stud head, said cavity further including a closure surface adjacent to and completely around said opening that converges in a direction into said cavity,
a cap having opposed inner and outer sides and a peripheral closure surface extending between said inner and outer sides that substantially conforms to said cavity closure surface, whereby said cap may be inserted inner side first into said opening after said stud has been inserted into said cavity to thereby engage said cap and cavity closure surfaces to seal said opening,
at least one deformable protuberance extending a predetermined distance from said cap outer side,
a housing member having a surface portion, and,
cover means having a surface portion and adapted to fix said socket to said housing member after said cap has been inserted into said opening with said cap outer side facing one of said said housing member and cover means surface portions, thereby completing said ball joint, said predetermined distance being sufficient to assure that said protuberance will engage and be deformed by one of said cover means and housing member surface portions as said ball joint is so completed regardless of any accumulated tolerance variations in said socket, stud, cap, cover means and housing member surface portions that may result in said cap outer side being spaced from said surface portions by a varying amount, said deformation acting to force said cap in a direction into said opening, thereby forcing said converging cavity closure surface and cap closure surface into tighter engagement to assure that said opening remains sealed by said cap.

2. A ball joint, comprising;
a stud having a head and a shank,
a socket having a cavity with an opening sized so as to admit said stud head with said stud shank extending out of said cavity, said cavity further including a closure surface adjacent to and completely around said opening that converges in a direction into said cavity,
a cap having opposed inner and outer sides and a peripheral closure surface extending between said inner and outer sides that substantially conforms to said cavity closure surface, said cap further having an opening therethrough large enough to admit said stud shank and defined by a bearing seat surface engageable with said stud head, whereby said cap may be inserted inner side first into said opening and over said stud shank after said stud head has been inserted into said cavity to thereby engage said stud head and bearing seat and engage said cap and cavity closure surfaces to seal said opening,
at least one deformable protuberance extending a predetermined distance from said cap outer side,
a housing member, and,
cover means having a surface portion and adapted to fix said socket to said housing member after said cap has been inserted into said opening with said cap outer side facing said cover means surface portion, thereby completing said ball joint, said predetermined distance being sufficient to assure that said protuberance will engage and be deformed by said cover means surface portion as said ball joint is so completed regardless of any accumulated tolerance variations in said socket, stud, cap, cover means surface portion and housing member that may result in said cap outer side being spaced from said cover means surface portion by a varying amount, said deformation acting to force said cap in a direction into said opening, thereby forcing said converging cavity closure surface and cap closure surface into tighter engagement and forcing said cap bearing seat surface and stud head into tighter engagement to assure that said opening remains sealed by said cap.

3. A ball joint, comprising;
a stud having a head and a shank,
a socket having a cavity with opposed first and second openings to said cavity, with said first opening being large enough to admit said stud shank, but not said stud head, while said second opening is large enough to admit said stud head, said cavity further including a first bearing seat adjacent said first opening and engagable with said stud head, whereby said stud may be inserted shank first into said cavity through said second opening with said stud shank extending through said first opening and with said stud head engaged with said first bearing seat, said cavity further including a frustoconical closure surface that defines said second opening and that converges in a direction toward said first opening, a cap having opposed inner and outer sides and a peripheral frustoconical closure surface generally matching said cavity frustoconical closure surface and extending between said inner and outer sides, whereby said cap may be inserted inner side first into said second opening after said stud has been inserted into said cavity until said matching frustoconical cap and cavity closure surfaces engage to seal said second opening, said cap further including a second bearing seat engageable with said stud head when said cap is so inserted into said second opening to preload said stud head between said first and second bearing seats, at least one deformable protuberance extending a predetermined distance from said cap outer side, a housing member having a surface portion, and, cover means adapted to fix said socket to said housing member after said cap has been inserted into said second opening with said cap outer side facing said housing member surface portion, thereby completing said ball joint, said predetermined distance being sufficient to assure that said protuberance will engage and be deformed by said housing member surface portion as said ball joint is so completed regardless of any accumulated tolerance variations in said socket, stud, cap and housing member surface portion that may result in said cap outer side being spaced from said housing member surface portion by a varying amount, said deformation acting to force said cap in a direction toward said first opening, thereby forcing said matching frustoconical cap and cavity closure surfaces into tighter engagement to assure that said second opening remains sealed by said cap and to also maintain the preload of said stud head between said first and second bearing seats.

* * * * *